US007804621B2

(12) United States Patent
Drexler

(10) Patent No.: US 7,804,621 B2
(45) Date of Patent: Sep. 28, 2010

(54) PRINTING OR COPYING SYSTEM FOR PROCESSING SINGLE SHEETS AND METHOD FOR CONTROLLING SUCH A PRINTING OR COPYING SYSTEM

(75) Inventor: Hubert Drexler, Taufkirchen (DE)

(73) Assignee: Oce Printing Systems GmbH, Poing (DE)

( * ) Notice: Subject to any disclaimer, the term of this patent is extended or adjusted under 35 U.S.C. 154(b) by 790 days.

(21) Appl. No.: 11/755,317

(22) Filed: May 30, 2007

(65) Prior Publication Data

US 2007/0277693 A1 Dec. 6, 2007

(30) Foreign Application Priority Data

May 31, 2006 (DE) ...................... 10 2006 025 454

(51) Int. Cl.
*G06K 1/00* (2006.01)
*G06K 15/00* (2006.01)
*G06K 9/70* (2006.01)
*G06F 3/12* (2006.01)
*G03G 15/00* (2006.01)
*B65H 5/34* (2006.01)

(52) U.S. Cl. ...................... 358/1.9; 358/1.13; 358/1.14; 358/1.15; 358/406; 358/504; 358/1.17; 358/1.16; 382/226; 399/368; 399/369; 399/371; 399/387; 399/396; 271/182; 271/270

(58) Field of Classification Search .................. 358/1.9, 358/1.13, 1.14, 1.15, 406, 504, 1.17, 1.16; 382/226; 399/368, 369, 371, 387, 396; 271/182, 271/270
See application file for complete search history.

(56) References Cited

U.S. PATENT DOCUMENTS

| | | | |
|---|---|---|---|
| 5,489,969 A | 2/1996 | Soler et al. | |
| 6,647,239 B2 * | 11/2003 | Oberhoffner | 399/361 |
| 6,917,435 B2 | 7/2005 | Sack | |
| 6,942,216 B1 * | 9/2005 | Koelle | 271/270 |
| 7,224,913 B2 * | 5/2007 | Richards | 399/16 |
| 2002/0122200 A1 | 9/2002 | Sack | |
| 2003/0128385 A1 | 7/2003 | Folkins | |
| 2006/0239699 A1 * | 10/2006 | Heimbach et al. | 399/16 |

FOREIGN PATENT DOCUMENTS

| | | |
|---|---|---|
| DE | 100 41 870 | 3/2002 |
| DE | 102 50 194 | 5/2004 |
| EP | 0 735 431 | 7/2002 |
| WO | WO 99/50715 | 10/1999 |

* cited by examiner

*Primary Examiner*—Charlotte M Baker
(74) *Attorney, Agent, or Firm*—Schiff Hardin LLP

(57) ABSTRACT

The method or system for controlling a printing or copying system for processing single sheets, a first single sheet and at least a second single sheet immediately following the first single sheet is processed with aid of n processing units. A required minimum distance between the first and the second single sheet is determined for each processing unit. A delay distance is determined for the first and at least for each of the n−1 following processing units. A difference between the minimum distance of a processing unit and a sum of the delay distances of the preceding processing units is formed. A smallest possible distance with which the second single sheet is fed to the first processing unit after the first single sheet is determined by a highest value of the determined minimum distance of the first processing unit and the determined differences.

23 Claims, 9 Drawing Sheets

Connecting structure with UP³I

Target distance calculation per sheet

PRINTING OR COPYING SYSTEM FOR PROCESSING SINGLE SHEETS AND METHOD FOR CONTROLLING SUCH A PRINTING OR COPYING SYSTEM

BACKGROUND

The preferred embodiment relates to a printing or copying system for processing single sheets as well as to a method for controlling such a printing or copying system. In particular, the preferred embodiment relates to printing or copying systems comprising several processing units which successively process fed single sheets. When sequentially processing these single sheets, a distance is required between the single sheets so that the necessary processing steps for a desired processing of each single sheet can be safely performed.

In particular, in high-performance printing or copying systems having printing rates of >100 sheets DIN A4 per minute and printing speeds of up to >1 m/s, a reduction in the printing rate as a result of too great sheet distances results in a lower productivity of the printing or copying system and thus in higher costs. An optimization of the sheet distances to actual smallest possible minimum distances or at least an approximation to the smallest possible minimum distance between two successive single sheets is required in order to enable an optimum utilization of these high-performance printing or copying systems.

From the document WO 99/50715, the processing and transporting of several single sheets through a printing or copying system in groups is known, each of the groups comprising several single sheets, in particular six single sheets. Each of the single sheets assigned to a group is preferably processed with the aid of the printing or copying system using the same processing steps, as a result whereof the temporal distance and/or the spatial distance remains constant between the single sheets of a group so that a small safety distance can be provided between the single sheets of a group.

The processing steps to be performed by the printing system and required for processing a single sheet or several single sheets, are preferably determined by a control unit of the printing or copying system that is designed as a data processing unit during the processing of a print data stream and/or the processing of print job-accompanying data assigned to the print data. These print job-accompanying data can be included in a job ticket, in particular in a standardized form such as the JDF. Such a control unit of the printing or copying system is preferably a print controller known per se, such as, for example, a print controller used by the applicant under the name SRA controller, which interprets the print data and/or the print job-accompanying data. The interpretation of the data preferably takes place with the aid of a parsing operation performed by the print controller. Such a parsing operation is known, for example, from document U.S. Pat. No. 6,917,435 and document DE 100 41 870. Starting out from the known prior art, the feed of single sheets into a printing or copying system is to be optimized in order to better meet at least some of the following requirements:

- to achieve a printing rate as high as possible,
- the processing of the single sheets in the printing or copying system is to take place in a safe and trouble-free manner, wherein, in particular, paper jams as a result of single sheets having too little distance to one another or of overlapping single sheets is to be avoided, and/or
- the sequential processing of single sheets in several processing units arranged one after the other is to take place in a safe and time-optimized manner.

Regarded as processing units are in particular:

- pre-processing devices such as turn-over or rotating devices for turning over or rotating single sheets,
- a printing device or several printing devices arranged one after the other, wherein the printing device or the printing devices can each comprise several printing units, and
- post-processing devices such as turn-over, rotating, stapling, punching, binding, folding, embossing, reading, enveloping and/or franking units or franking devices; and
- further additional devices such as interposers which interpose additional single sheets into the sequence of single sheets fed by the feed unit, i.e. they additionally insert them into the sequence, preferably between two successive single sheets, and which can interpose the single sheets upstream or downstream of a printing device, preferably downstream of the printing device or downstream of at least one post-processing device.

Both the image generating processes for generating the desired print images on the single sheets as well as the pre- and post-processing processes for processing the single sheets are becoming more and more comprehensive and demanding due to increased requirements on the printing products. In addition, there is the request and the demand to be able to combine devices of different manufacturers in one processing sequence for processing the single sheets. For meeting the increased requirements on the processing sequence, print job-accompanying data, so-called job ticket data, is provided in the prior art, which, in addition to a print data stream or document data stream is exchanged between several software and/or hardware systems. The job ticket data are preferably stored in a separate data file and correspondingly preferably in a job definition format known as JDF. Regarding this job definition format, there exists a corresponding job messaging format, referred to as JMF. An industrial consortium has agreed upon the JDF specification for the exchange of data formats in the printing process, which, at the time of the present patent application, can be downloaded in the version 1.3 of Sep. 30, 2005 via the web page http://www.cip4.org.

For the data exchange between printers as well as between pre- and post-processing units, an industrial consortium has standardized a data interface which is known as UP$^3$I (Universal Printer Pre- and Post-Processing Interface). With the aid of this data interface, the exchange of control data and processing information between printing devices and pre- and post-processing devices combined with these printing devices is defined. Details on this data interface are published on the web page http://www.up3i.org. All documents and publications mentioned are herewith incorporated by reference into the present specification. The methods, systems and measures described in these documents and publications can be advantageously used in connection with the present invention.

SUMMARY

An object is to specify a printing or copying system for processing single sheets as well as a method for controlling such a printing or copying system, by which a smallest possible distance with which the second single sheet can be fed to a first processing unit of the printing or copying system after the first single sheet can easily be determined.

In a method or system for controlling a printing or copying system for processing single sheets, the first single sheet and at least a second single sheet immediately following the first single sheet is processed with aid of n processing units. A required minimum distance between the first and the second single sheet is determined for each processing unit. A delay distance is determined for the first and at least for each of the n−1 following processing units. A difference between the minimum distance of a processing unit and a sum of the delay distances of the preceding processing units is formed. A smallest possible distance with which the second single sheet is fed to the first processing unit after the first single sheet is determined by a highest value of the determined minimum distance of the first processing unit and the determined differences.

DESCRIPTION OF THE PREFERRED EMBODIMENT

Figure 1:
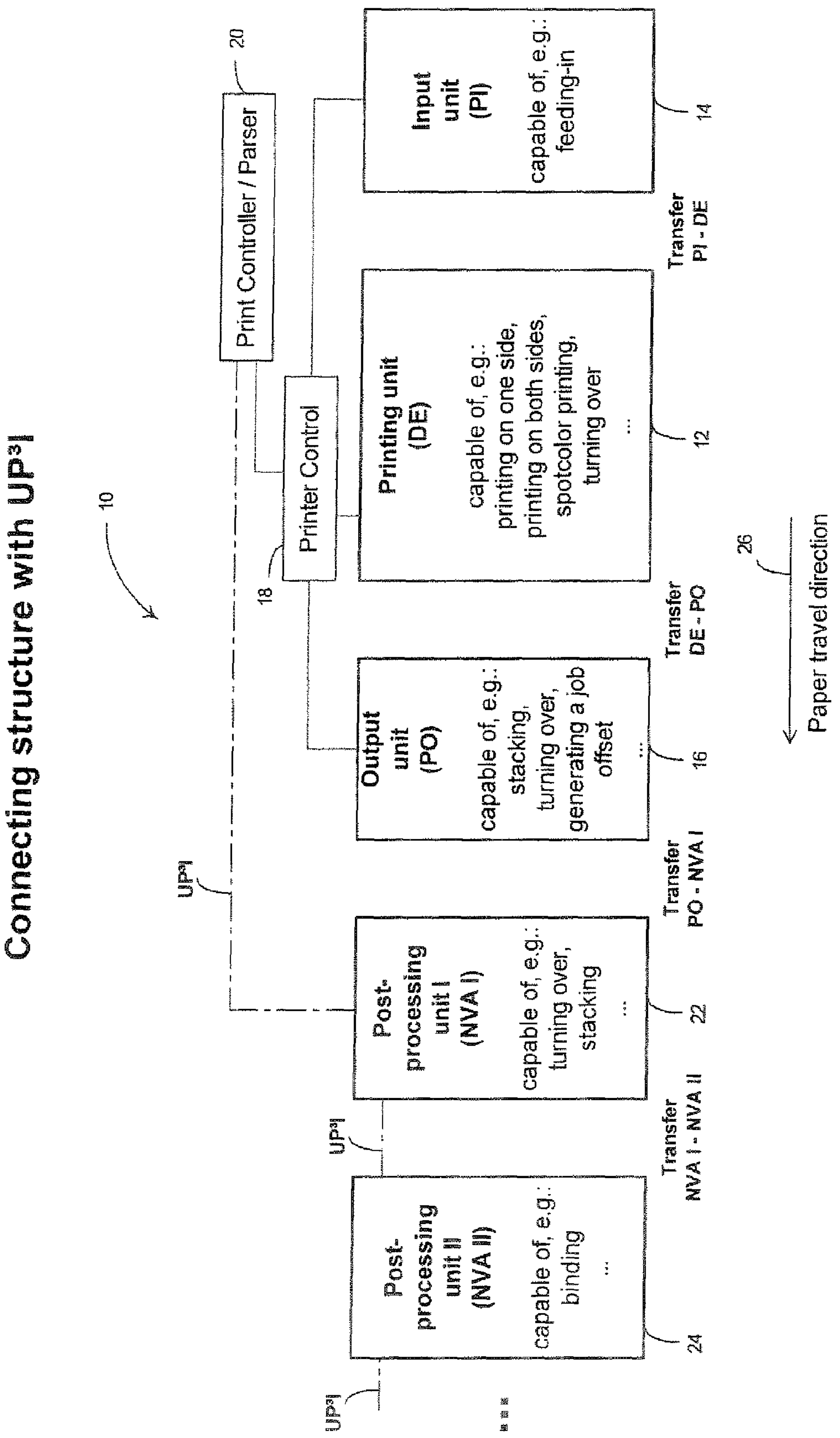
FIG. 1 is a schematic illustration of cooperating processing units of a high-performance printing system for processing single sheets according to a first embodiment.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

The preferred embodiment is based on the idea that the smallest possible distance with which the second single sheet can be fed to the first processing unit after the first single sheet, i.e. the shortest feed distance, depends on the respective processing steps required for the processing of the first and of the second single sheet, in particular on the different processing times for performing the processing steps for processing the first single sheet and the processing steps for processing the second single sheet. In case of a longer processing time for the second single sheet in a processing unit of the printing or copying system compared to the processing time for the first single sheet in the same processing unit, the distance between the first single sheet and the second single sheet when exiting this processing unit is greater compared to the distance between these single sheets when feeding these sheets into this processing unit as a result of the different processing times. According to the first aspect of the preferred embodiment, this greater or increased distance is taken into account in the determination of the effect of the required minimum distance of the following processing units on the shortest feed distance to be determined. The minimum distance of these following processing units can be reduced by the increased distance for the determination of the effect on the feed distance.

In case of a shorter processing time for the second single sheet in a processing unit compared to the processing time for the first single sheet in the same processing unit, the distance between the first single sheet and the second single sheet when exiting this processing unit is reduced compared to the distance between these single sheets when feeding these into this processing unit as a result of these different processing times. According to the first aspect of the preferred embodiment, this smaller, i.e. reduced distance is taken into account in the determination of the effect of the required minimum distance of the following processing units on the shortest feed distance to be determined. The minimum distance of these following processing units has to be increased by the reduced distance for the determination of the effect on the feed distance.

Special advantages of the preferred embodiment result at so-called job boundaries and set boundaries, when the first single sheet is the last single sheet of a first print job or of a first set of a print job, and the second single sheet is the first single sheet of a second print job or set. A print job can comprise several sets. The two printing jobs or sets preferably require different processing steps for processing the two single sheets in the same processing unit of the printing or copying system and/or specify other paper formats, as a result whereof a first processing time for executing the processing steps for processing the first single sheet and a second processing time for executing the processing steps for processing the second single sheet, which is different from the first processing time, are required.

Advantages also result when the first single sheet and the second single sheet are processed by the same print job and the print job requires different processing steps for processing the two single sheets in the same processing unit of the printing or copying system and/or specifies other paper formats, as a result whereof a first processing time for executing the processing steps for processing the first single sheet and a second processing time for executing the processing steps for processing the second single sheet, which is different from the first processing time, are required.

In case of a so-called group processing of a group comprising several, for example six single sheets to be processed one after the other, particular advantages of the preferred embodiment can be achieved in particular in the determination of the smallest possible distance between the last single sheet of a first group and the first single sheet of a second group immediately following the first group, if different processing steps for processing the last single sheet of the first group and the first single sheet of the second group in the same processing unit of the printing or copying system are provided and/or other paper formats are specified for these two single sheets, as a result whereof a first processing time for executing the processing steps for processing the last single sheet of the first group and a second processing time for executing the processing steps for processing the first single sheet of the second group, which is different from the first processing time, are required. Such a group processing of single sheet groups is known from WO 99/50715, the contents of which are herewith incorporated by reference into the present specification.

For the purposes of the preferred embodiment, what is referred to as immediately following single sheets are single sheets which are to be transported successively through the processing units of the printing or copying system and between which no further single sheet is transported. Between the rear edge of the first sheet and the front edge of the second single sheet immediately following the first single sheet, a required safety distance is set as a period of time and/or a spatial distance for a safe operation of the respective processing unit. The safety distance may not be fallen below when executing the processing steps of the processing unit. Immediately following single sheets being in particular not separated from one another by printing stops of the printing or copying system.

What is referred to as distance between the single sheets is the spatial distance between the front edge of the first single sheet and the front edge of the second single sheet or the period of time for generating this spatial distance given a predetermined transport speed and/or given a predetermined transport speed curve. The minimum distance between the first single sheet and the second single sheet is the sum of the length of the first single sheet or the period of time resulting from the transport speed and the length of the first single sheet and the safety distance between the two single sheets.

Distances and lengths are specified in the transport direction along a transport path of the respective single sheet through the printing or copying system, unless explicitly stated otherwise.

For a simple handling, distances can be specified and/or processed as spatial distances and as periods of time. Given a multiplication with the transport speed of the single sheet or single sheets, each period of time corresponds to a spatial distance, and each spatial distance corresponds to a period of time when divided by the speed. The periods of time specify the duration of a time interval.

A delay distance between two immediately following single sheets results from the difference between the processing time of a second single sheet and the processing time of the first single sheet. The delay distance is preferably determined for each second single sheet (for each single sheet immediately following a first single sheet) dependent on the first single sheet to be processed immediately before this second single sheet and on the processing steps to be performed for processing the second single sheet and the processing steps to be performed for processing the first single sheet for each processing unit, i.e. component-dependent. This delay distance specifies a difference in distance between the first single sheet and the second single sheet. For further processing, this delay distance can be processed as a temporal delay distance or as a spatial delay distance.

In a feed unit of the printing or copying system, the distance between two immediately following single sheets can also be specified by a feed interval, in particular a period of time. The period of time then specifies the duration of a time interval that is to pass between the output of the front edge of the first sheet and the output of the front edge of the second sheet from the feed unit. As a result thereof, the feed unit of a downstream processing unit of the printing or copying system feeds the first and the second single sheet with a distance corresponding to the feed interval. For the determination of the smallest possible feed interval or the smallest possible distance, pieces of information from the print data stream and/or from the print job-accompanying data, pieces of information on parameters of the single sheets to be processed, in particular on the paper format and/or further paper parameters, as well as pieces of information on pre- and/or post-processing units to be used are made use of.

At least part of the pieces of information required for the determination of the smallest possible feed interval as well as the feed interval determined are transferred between at least two process components of the printing or copying system. Preferably, a process component allocated to a processing unit transfers pieces of information for performing possible processing steps, in particular as parameters, to a process component for determining the smallest possible feed interval. It is particularly advantageous when the process component allocated to the processing unit transfers pieces of information format-related to possible formats of the single sheets to be processed and/or related to format ranges of possible single sheets to be processed.

A minimum distance with respect to a preceding first single sheet required for performing the processing steps provided for processing a second single sheet in a processing unit of the printing or copying system is set or determined taking into account the processing steps provided for processing the first single sheet in the processing unit of the printing or copying system. The minimum distance comprises the required safety distance between the two single sheets. The minimum distance is calculated such that the safety distance between the two immediately following single sheets is not fallen below during the entire processing by the respective processing unit even if the distance decreases as a result of the processing in the individual processing units.

The feed interval, the delay times as well as the processing unit-related minimum distances are preferably individually determined for each single sheet in a control unit, such as the device control unit and/or a print controller for processing the print data stream and/or the print job-accompanying data. In advantageous developments of the preferred embodiment, the processing-related minimum distances are transferred between process components of the printing or copying system, preferably via at least one standardized data interface, such as a $UP^3I$ interface, a type1-interface or another suitable data interface. The process components are software and/or hardware components, at least one of the processing units having a control unit which provides such a process component for this processing unit.

At least one piece of information on the minimum distance required for this processing unit is transferred from the process component of the processing unit to a further process component of the printing or copying system which then defines the feed distance taking into account this piece of information or the minimum distance determined with the aid of this piece of information. These pieces of information can also be forwarded from and/or to other process components. Should an exchange of information not be possible, the corresponding pieces of information can also be deposited in the control unit. The pieces of information can include specifications for the determination of the minimum distances of the processing unit, can comprise the minimum distances for several single sheet lengths and/or comprise minimum distances which are dependent on possible processing steps.

Preferably, a process component for providing pieces of information for the determination of the minimum distance for this processing unit is allocated to each processing unit, which process component is provided in particular for some of the processing units by a control unit of the respective processing unit.

The preferred embodiment can advantageously be used in the case of modularly structured printing and manufacturing lines which produce print products and preferably pack these ready for dispatch.

The distance with which the second single sheet is fed to the first processing unit after the first single sheet, is, as already mentioned in the introductory par of the specification, also referred to as feed distance According to the first aspect of the preferred embodiment, in a printing or copying system having two processing units arranged one after the other or in the case of two processing units to be analyzed which are arranged one after the other, the feed distance is determined by the higher value from the following values:

- the determined minimum distance of the first processing unit; and
- the difference between the minimum distance of the second processing unit and the delay distance of the first processing unit.

According to the first aspect of the preferred embodiment, in a printing or copying system having three processing units arranged one after the other or in the case of three processing units to be analyzed which are arranged one after the other, the feed distance is determined by the higher value from the following values:

- the determined minimum distance of the first processing unit;
- the difference between the minimum distance of the second processing unit and the first delay distance of the first processing unit; and
- the difference between the minimum distance of the third processing unit and the sum of the delay distance of the first processing unit and the delay distance of the second processing unit.

It is advantageous to use temporal distances for the determination of the feed distance. The set smallest possible distance with which the second single sheet is fed to the first processing unit after the first single sheet can be preset in a feed unit as a desired value in the form of a spatial distance or a period of time. This desired value thus determines the already mentioned feed interval of the feed unit.

The determined smallest possible distance takes into account that also a minimum distance to be kept between the first single sheet and the second single sheet in the second processing unit and in possible further downstream processing units of the printing or copying system is kept, a too large and a too small feed distance being avoided according to the preferred embodiment in particular by taking into account the delay times of the preceding processing units. In the determination of the distance, it is advantageously taken into account

- whether the single sheets have different sheet travel times or processing times in at least one processing unit,
- whether the single sheets have different sheet travel times or processing times in at least one of the processing units in at least two processing modes,
- whether the distance between the first and the second single sheet decreases and/or increases during the processing of the single sheets,
- which minimum distances are required between the single sheets in the individual processing units, and/or
- which operating modes to be set in the processing units are required for performing the processing steps determined.

The processing units are preferably processing units arranged immediately one after the other between which no further processing unit is provided, wherein further processing units can be provided upstream of the first and/or downstream of the last considered processing unit through which the single sheets can be transported without an interruption of a continuous workflow for processing the single sheets by these processing units.

The determination of the distances between single sheets to be processed one after the other as well as the respective required control of the sheet feed by a feed unit preferably takes place for each single sheet dependent on parameters, resulting from:

- print data for processing these single sheets;
- possibly available print job-accompanying data assigned to these print data;
- single sheet parameters, such as the paper format and the grammage (weight per unit area), which are determined from the print data or the print job-accompanying data;
- as well as from requirements of post-processing units with respect to the processing steps to be performed specifically by these post-processing units for each single sheet.

From the print data and/or print job-accompanying data, it can, in particular, be determined for each single sheet to be processed, whether it is to be printed on one side, on both sides, with a single color, with two colors and/or stacked face upwards or downwards.

A second aspect of the preferred embodiment relates to a printing or copying system comprising a first processing unit and comprising at least a second processing unit arranged downstream of the first processing unit, which each sequentially process a first single sheet and at least a second single sheet immediately following the first single sheet. The printing or copying system has a first process component which determines a feed distance with which a second single sheet is fed to a first processing unit of the printing or copying system after a first single sheet. Further, the printing or copying system comprises means with the aid of which the second processing unit transfers data with pieces of information for determining a required second minimum distance which is dependent on the processing steps to be performed with the aid of the second processing unit, or data with pieces of information on the determined second minimum distance required between the first single sheet and the second single sheet to the first processing unit.

The first process component or a further process component determines a required first minimum distance which is dependent on the processing steps to be performed with the aid of the second processing unit. The first process component determines the feed distance dependent on the first minimum distance and the second minimum distance.

Further, the second aspect of the preferred embodiment relates to a method for controlling such a printing or copying system. The subject-matters according to the second aspect of the preferred embodiment achieve that the minimum distances of the individual processing units which distances are required for the determination of the feed distance are easily determined and then communicated to the unit which determines the feed distance.

For this, the process component of the unit for determining the feed distance does not have to know all requirements of the pre-processing, post-processing and/or printing units. According to the second aspect of the preferred embodiment, these pieces of information are rather transferred from a process component allocated to the respective (second) processing unit to the process component for determining the distance. This transfer can take place upon request of the first process component for determining the feed distance or during an initialization process of the printing or copying system.

It is also conceivable to transfer processing parameters for processing a single sheet to the second process component, which then transmits a concrete minimum distance and/or further specifications, such as a delay time or a delay distance with respect to a preceding single sheet, to the first process component.

The process components are hardware and/or software components between which a communication or a data transfer on influencing factors having an influence on a required feed distance, in particular such influencing factors which increase or decrease the required feed distance, takes place. The communication between various processing units as well as between process components of the printing or copying system can take place with the aid of a standardized data interface such as a $UP^3I$ interface.

In particular, in the case of comprehensive processing processes, in which the single sheets are not only printed but are also processed with the aid of several pre- and/or post processing units, a high functionality is possible by means of which the determination of the shortest possible feed distance is made more difficult, in particular when the control unit for determining the shortest possible feed distance does not have all processing times and required minimum distances for each of these pre- and post-processing units available in a processing step-dependent manner and for each single sheet.

For the purposes of promoting an understanding of the present preferred embodiment, reference will now be made to the preferred embodiments illustrated in the drawings and specific language will be used to describe the same. It will nevertheless be understood that no limitation of the scope of the invention is thereby intended, such alterations and further modifications in the illustrated devices and/or the described methods, and such further applications of the invention as illustrated therein being contemplated as would normally occur now or in the future to one skilled in the art to which the invention relates.

In FIG. 1, a schematic illustration of processing units and processing components of a high-performance printing system 10 according to a first aspect of the preferred embodiment is shown. The high-performance printing system 10 has an image generating unit 12 which preferably operates according to an electrographic, in particular according to an electrophotographic, principle. This image generating unit 12 comprises two printing units which print fed single sheets optionally on one side on both sides, with two colors on one side and with to colors on both sides. At least for the two-color printing of the single sheet on both sides, this single sheet is turned-over at least once in the image generating unit 12. Common high-performance printers can process or, respectively, print more than 100 pages DIN A4 per minute. The printer, Océ Varioprint 6250, produced and distributed by the Assignee OCE Printing Systems GmbH, can print 250 pages A4 and alternatively 132 pages A3 per minute.

For feeding single sheets to the image generating unit 12, an input unit 14 is provided which feeds the single sheets to be processed one after the other at a predetermined feed interval, i.e. with a predetermined distance. After the fed single sheets have been printed by the image generating unit 12, the single sheets are supplied to an output unit 16. The output unit 16 can, in particular, stack the single sheets, turn them over, generate a job offset or sort several single sheets. The input unit 14, the image generating unit 12 and the output unit 16 are each connected to a printer control 18. With the aid of this printer control 18, the processing units 12 to 16 are controlled. Preferably, the processing units 12 to 16 are pre-configured as modularly structured units. The processing units 12 to 16 can comprise further control units which cooperate with the printer control 18. The printer control 18 comprises a device control of the printing or copying system 10.

Preferably, data is transferred between the printer control 18 and these further control units via data lines, preferably via data buses and network connections. Further, the printing system 10 comprises a print controller 20 which is provided for processing a print data stream that has been supplied and/or print job-accompanying data. This controller 20 analyses the pieces of information contained in the print data stream and/or in the print job-accompanying data preferably with the aid of a parsing operation. Such a parsing operation is, for example, described in document U.S. Pat. No. 6,917, 435. The print controller 20 for performing the parsing operation is also referred to as a parsing controller.

In particular, the print controller 20 analyses the processing steps to be performed by the input unit 14, the image generating unit 12 and the output unit 16 as well as by the post processing units 22 and 24 for meeting the requirements of the pieces of information contained in the print data stream and/or in the print job-accompanying data on processing the single sheets. With the aid of these required processing steps that have been determined, the printer control 18 determines the processing times required for performing these processing steps in the individual processing units 12 to 16, 22, 24 for several single sheets immediately following one another.

The processing times required for performing the individual processing steps are available for executable processing step combinations of the individual processing units 12 to 16, 22, 24 in order to determine the required processing time on the basis of the determined processing steps required for processing a concrete single sheet. For this purpose, during an initialization process of the printing or copying system, such pieces of information can be transferred from the post-processing devices 22 and/or 24 to the printer control 18 preferably format-dependent for several processing step combinations to be performed by the respective post-processing unit 22, 24.

Alternatively or additionally, the processing times for performing processing step combinations by the individual processing units 22, 24 can be retrieved by the printer control 18 from these processing units 22, 24. This can be done both for exemplary requirements, in that the processing times for requirement ranges, in particular for length ranges and grammage ranges of single sheets to be processed are determined and set, or in the form of an individual requirement for a special single sheet to be processed dependent on the processing steps specially provided for this single sheet.

Alternatively, the processing times of the individual processing units can be deposited in the printer control 18 if the data or communication interface does not support the data exchange between the printer control 18 and the processing units 22, 24.

The print controller 20 is connected to the post-processing unit 22 via a data interface referred to as $UP^3I$. The post-processing unit 22 is connected to a post-processing unit 24 via the data interface $UP^3I$ and the post-processing unit 24 is connected to at least one further post-processing unit via the data interface $UP^3I$. The $UP^3I$ data is transferred via a data line according to the standard IEEE 1394, a so-called fire wire connection. This connection is implemented as a chain-like connection, i.e. as a so-called daisy chain, between the print controller 20, the post-processing unit 22, the post-processing unit 24 and the possible further post-processing units 24.

The printer control 18 can communicate with the post-processing units 22, 24 and the further post-processing units with the aid of a data connection between the printer control 18 and the print controller 20 via the data interface $UP^3I$. Alternatively, the data interface $UP^3I$ can also be provided between the print controller 20 and the post-processing units

22, 24 with the aid of data connections arranged in a star-shaped manner and/or with the aid of another standardized data interface. In the present embodiment, the input unit 14, the image generating unit 12, the printer control 18 and the output unit 16 are not provided with the data interface UP$^3$I. In alternative embodiments, at least some of these units 12 to 18 have a data interface UP$^3$I and/or another standardized data interface for the data exchange. In alternative embodiments, the printer control 18 and the print controller 20 can also be replaced by a single data processing unit.

Each of the processing units 12, 16, 22, 24 and each of the following post-processing units requires for a safe execution of the processing steps for processing a single sheet, a minimum distance during the input and the output of the single sheet with respect to an immediately preceding single sheet to be processed by this processing unit in order to be able to perform the processing steps in a safe way. The minimum distance required during feeding can be different from the minimum distance required when exiting this processing unit. For determining the required minimum distance between two single sheets, in the embodiments described the minimum distance during the feed of following single sheets to a processing unit 12, 16, 22, 24 is considered and specified. The minimum distance is dependent both on the processing steps to be performed as well as on the required minimum distance when exiting the respective processing unit 12, 16, 22, 24. The processing order of the processing units required as a result of the processing sequence for processing the single sheets is indicated in FIG. 1 by the paper travel direction arrow 26, which order proceeds from the input unit 14 via the image generating device 12 via the output unit 16 via the post-processing device 22 to the post-processing unit 24 as well as further to possible other post-processing units.

The input unit 14 is also referred to as PI-Paper Input, the image generating unit 12 as DE-print unit, the output unit 16 as PO Paper Output, the post-processing unit 22 as NVAI and the post-processing unit 24 is also referred to as NVAII. The transfer points between the individual processing units of the high-performance printing system 10 are designated by these abbreviations of the processing units 12 to 16, 22, 24. The transfer point between the input unit 14 and the image generating unit 12 is thus referred to as transfer-PI-DE, the transfer point between the image generating unit 12 and the output unit 16 as transfer-DE-PO, the transfer point between the output unit 16 and the post-processing unit 22 as transfer-PO-NAVI and the transfer point between the post-processing unit 22 and the post-processing unit 24 as transfer-NVAI-NVAII.

The names for these transfer points are hereinafter used in explaining the travel times of sheet sequences in connection with FIGS. 4 and 5.

Figure 2:
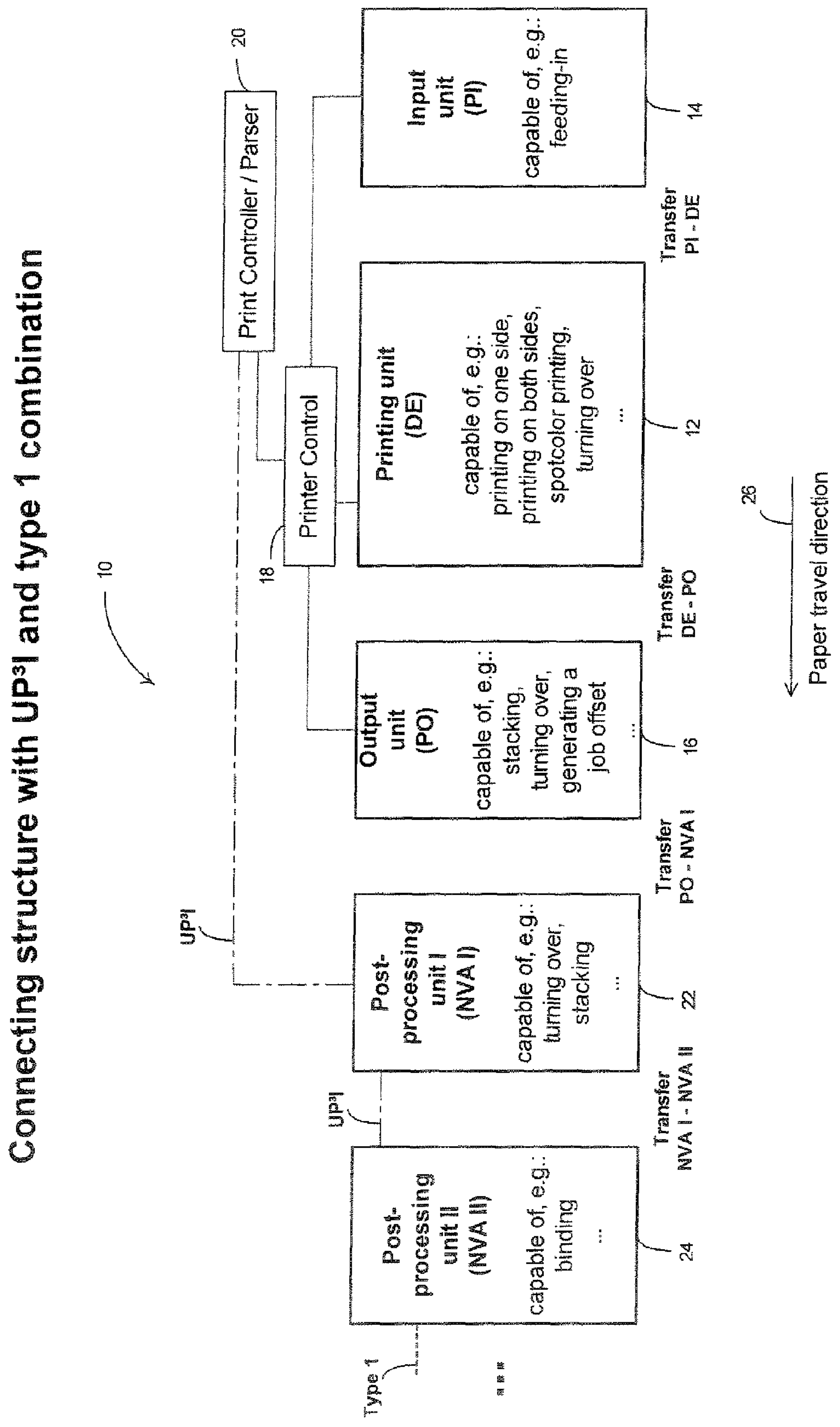
FIG. 2 is the schematic illustration of the processing units of the high-performance printing system of FIG. 1 according to a second embodiment.

In FIG. 2, the high-performance printing system 10 of FIG. 1 is illustrated according to a second embodiment of the invention. Identical or equivalent elements have the same reference numbers.

In contrast to the configuration of the high-performance printing system 10 illustrated in FIG. 1, in the configuration of FIG. 2, further post-processing units connected to the post-processing unit 24 are not connected via a data interface UP$^3$I but via a data interface of the type 1 for communication between these further data processing units and the further components and processing units of the printing system 10, in particular the print controller 20 and the printer control 18. Alternatively, a type 2, a DFA or a proprietary data interface or a CAN bus having a suitable communication protocol for data transfer or for communication between the processing units 12, 14, 16, 22, 24 and the print controller 20 can also be used. These data interfaces of the type 1 of type 2, the DFA data interface as well as proprietary interfaces are mentioned in the introduction of the already mentioned UP$^3$I specification, version 1.20, chapter 1.3.1. With the aid of these data interfaces, basic control information and status information which, for example, relate to a paper transport stop, can be exchanged between printing devices and pre- and post-processing devices.

With the aid of the UP$^3$I data interface, a complex communication between the processing control and printing units is possible so that with the aid of this communication via the UP$^3$I data interface complex control functions up to the "remote operating control" of processing and printing units can be implemented. Further, UP$^3$I control information, i.e. UP$^3$I data, can be embedded into print data streams, such as IPDS, as explained in chapter 1.3.3 and in chapter 3 of the UP$^3$I specification mentioned. These UP$^3$I data can then be used directly or indirectly for controlling the processing units 12, 14, 16, 22, 24.

Figure 3:
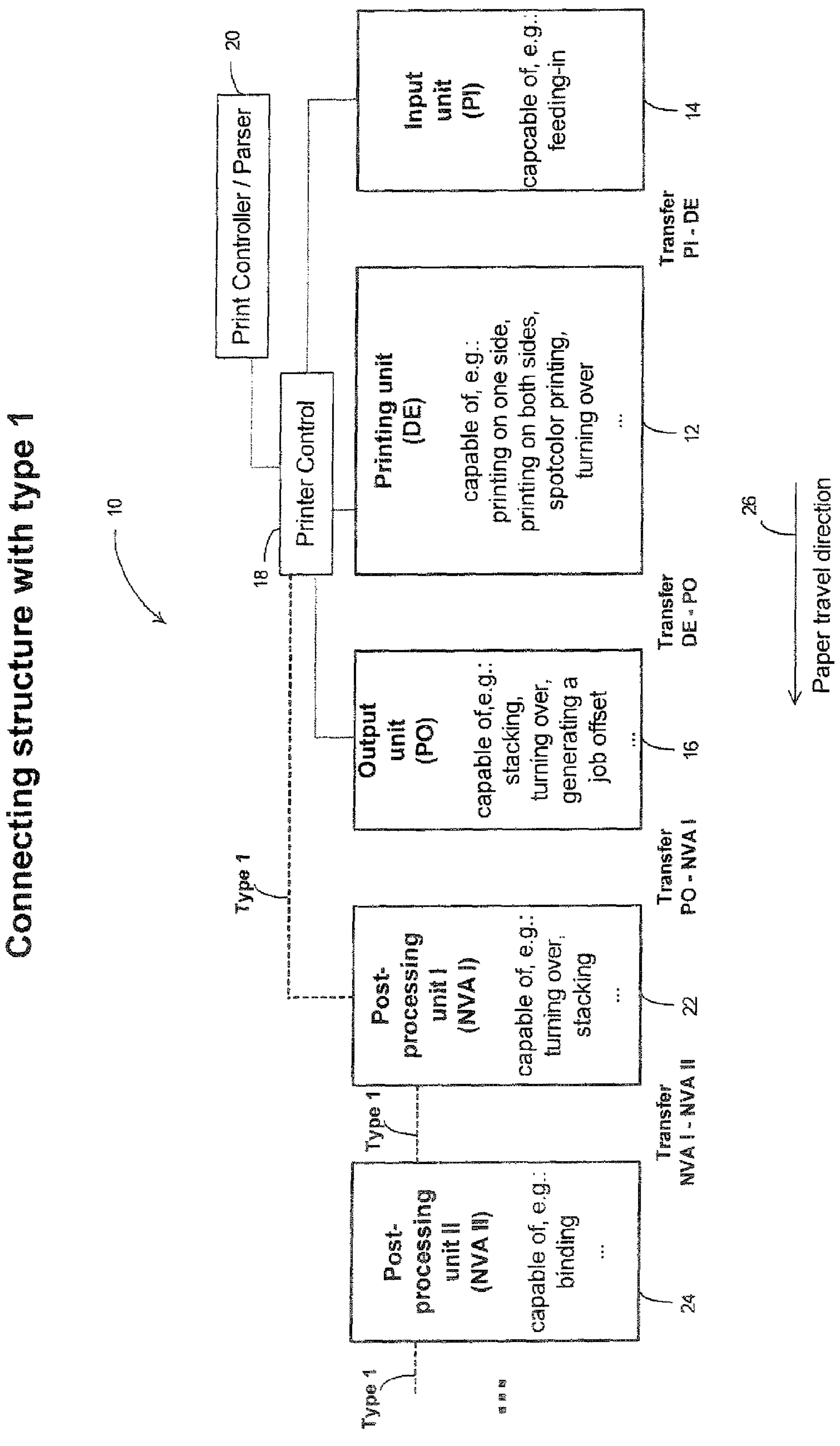
FIG. 3 is the schematic illustration of the processing units of the high-performance printing system of FIGS. 1 and 2 according to a third embodiment.

In FIG. 3, the high-performance printing system 10 of FIGS. 1 and 2 is illustrated according to a third embodiment of the invention, in the configuration of the high-performance printing system 10 illustrated in FIG. 3, the post-processing unit 22 being directly connected via a data interface of the type 1 with the printer control 18. The post-processing unit 22 is likewise connected to the post-processing unit 24 via data interface of the type 1 and the post-processing unit 24 is likewise connected via a data interface of the type 1 with possible further post-processing units.

Figure 4:
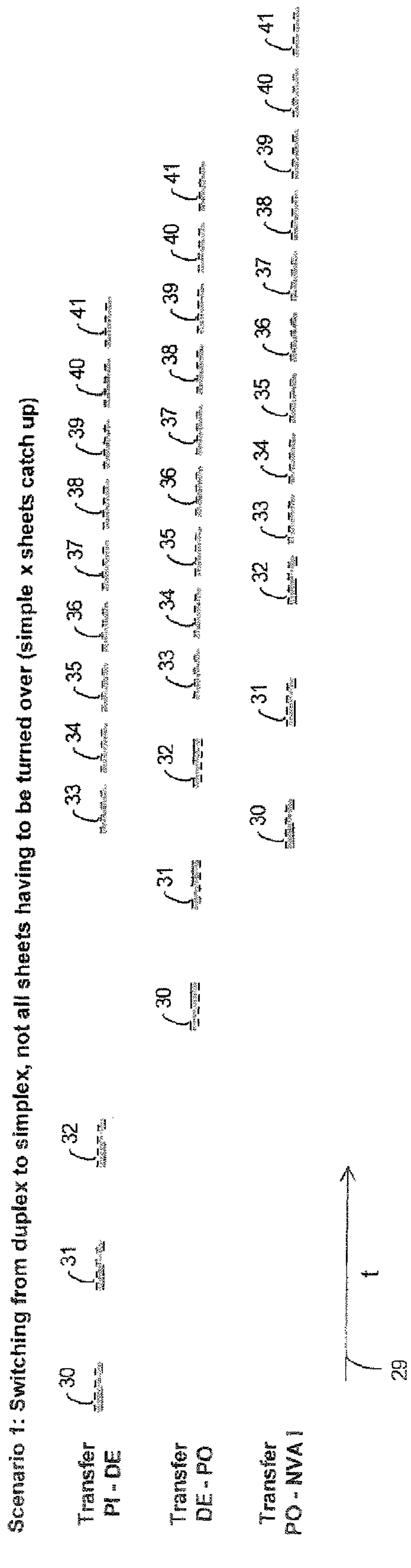
FIG. 4 shows a chronological sequence of the transfer points in time of several single sheets between the processing units of the high-performance printing system during switching of the operating mode of the printing unit from printing the first three single sheets on both sides to printing the following single sheets on one side.

In FIG. 4, the chronological sequence of altogether twelve single sheets 30 to 41 to be successively processed by the high-performance printing system 10 of FIGS. 1 to 3 is shown. The first three single sheets 30 to 32 are printed on both sides so that, as a result of this way of processing, these single sheets 30 to 32 printed on both sides have to be turned over in the image generating unit 12 after printing, as a result whereof the output of these sheets from the image generating unit 12 is delayed and a minimum distance has to be provided between the single sheets 30 to 32 which ensures that also during the turn-over process in a turn-over device of the image generating unit 12 a sufficient distance is kept between the single sheets 30 to 32 for this turn-over process. Thus, the single sheets 30, 31, 32 have to be transferred from the input unit 14 to the image generating unit 12 at the transfer point PI-DE with a relative large distance.

After the single sheet 32, the requirements for processing the following single sheets 33 to 41 change since these following single sheets 33 to 41 only have to printed on one side. These single sheets 33 to 41 do not have to be turned over in the image generating unit 12 so that their processing time in the printing unit is less than the processing time of the single sheets 30 to 32. Since the processing time of the single sheet 33 and of the following single sheets 34 to 41 is less than the processing time of the single sheet 32 and of the single sheets 30 and 31 to be processed before, the distance between the single sheets 32 and 33 in the image generating unit 12 is decreased so that the distance between the single sheets 32 and 33 during the output from the image generating unit 12 at the transfer point DE-PO is considerably less than during the input of these single sheets 32, 33 into the image generating unit 12 at the transfer point PI-DE. This decrease in the distance is also referred to as "catch up", as a result whereof the single sheets 33 to 41 catch up with respect to the single sheets 30 to 32, in particular the single sheet 33 catches up with respect to the single sheet 32.

In order to stack the single sheets 30 to 32 printed on both sides with the face upward, as in the case of the single sheets 33 to 41 printed on one side, in contrast to the single sheets 33 to 41, an additional turn-over operation is required for the single sheets 30 to 32, which is performed as a processing step by the output unit 16. Thus, the processing of the single sheet 32 in the output unit 16 also takes longer than the processing of the single sheet 33 processed immediately thereafter so that the single sheet 33 further catches up towards the single sheet 32.

The catching up of the single sheet 33 with respect to the single sheet 32, as well as an increase in the distance between to single sheets 32, 33 to be processed immediately one after the other, is generally also referred to as delay distance which results from the difference between the processing time of the following second single sheet 33 and the single sheet 32 that is to be processed immediately before. This delay distance is dependent on the processing times of the respective following single sheets in the respective processing unit required for the processing steps to be performed. Thus the delay distance is positive when the processing time of the second sheet 33 is longer than the processing time for processing the first single sheet 32. Accordingly, the delay distance is negative when the processing time of the first sheet 32 is longer than the processing time of the second sheet 33. When the single sheets 30 to 41 are output from the output unit 16 at the transfer point PO-NVAI, thus the distance between the single sheets 32 and 33 is further reduced due to the different processing times in the output unit 16 and approximately corresponds to the distance which is provided between the single sheets 33 to 41 immediately following one another. Thus, the distance between the single sheets 32 and 33 at the transfer point PI-DE is the smallest possible one in order to keep a required minimum distance between these two single sheets 32 and 33 at the transfer point PO-NVAI. The distances between single sheets 30 to 32; 33 to 41 which due to identical requirements are processed by the processing units 12 to 16, 22, 24 with the same processing steps, do not change in the processing units 12 to 16, 22, 24. The arrow 29 indicates the temporal course of the single sheets 30 to 41 through the processing units 12 to 16 up to the transfer point PO-NVAI. Negative delay distances of individual processing units 12 to 16, 22, 24 must either be compensated by positive delay distances of preceding processing units or result in a greater required feed distance with which the input unit 14 has to feed the immediately following single sheets 32 and 33 to the image generating unit 12.

Figure 5:
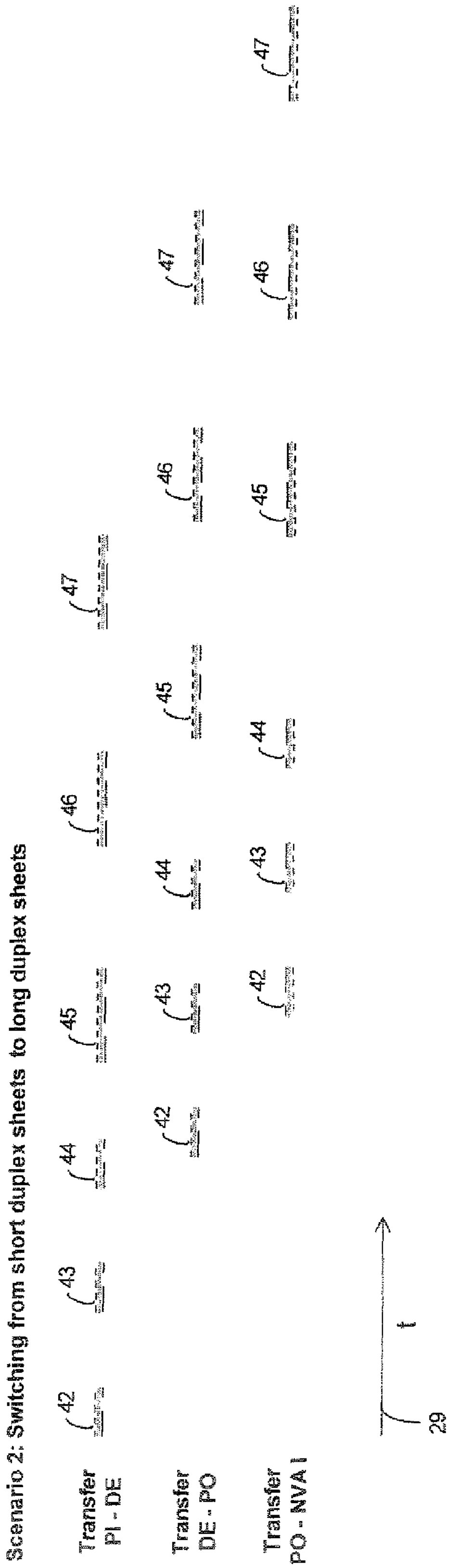
FIG. 5 shows the chronological sequence of several single sheets to be processed one after the other by the high-performance printing system, the first three single sheets illustrated having a first length which is shorter than the length of the following single sheets.

In FIG. 5, the sequence for processing several following single sheets 42 to 47 with the aid of the high-performance printing system 10 of FIGS. 1 to 3 is shown. The single sheets 42 to 44 have the paper format A4 and the single sheets 45 to 47 have the paper format A3. The single sheets 42 to 44 are transported and processed by the high-performance printing system 10 lengthways along the transport direction through the high-performance printing system 10 and the single sheets 45 to 47 are transported and processed in the vertical format. All single sheets 42 to 47 are printed on both sides with the aid of the image generating unit 12, i.e. on its front side and on its rear side successively or simultaneously. The single sheets 42 to 44 are processed by the high-performance printing system 10 in the same way as the single sheets 30 to 32 in the embodiment of FIG. 4.

Between the single sheets 42 to 47, relatively large feed distances are required since each of these single sheets 42 to 47 has to be turned over in the image generating unit 12, the single sheets 42 to 44 having about half the length compared to the single sheets 45 to 47 as viewed in transport direction. As a result of the difference in length, thus a shorter time is required for turning over the single sheets 42 to 44 compared to what is required for turning over the single sheets 45 to 47. The single sheets 44 and 45 immediately following one another have a first distance to one another at the transfer point PI-DIE, i.e. when being fed to the image generating unit 12, which first distance is dependent on the required processing time for the single sheet 44, in particular on the time required for turning the single sheet 44 over. The distance between these two single sheets 44, 45 is determined such that the processing steps can be safely performed in the image generating unit 12 without the single sheets 44, 45 impeding one another during the processing.

For turning the single sheet 44 over, a shorter time is required in the image generating unit 12 as a result of the shorter length in transport direction as compared to the turning over of the single sheet 45 which, in the transport direction, has twice the length of the single sheet 44. As a result thereof, there is a positive delay distance between the single sheets 44 and 45 in the printing unit 12. Due to this positive delay distance, the distance between the single sheets 44 and 45 is greater when they are output from the image generating unit 12, i.e. at the transfer point DE-PO, as compared to when they are input into the image generating unit 12, i.e. at the transfer point PI-DE. For stacking the single sheets 42 to 47 with their face upward, it is required that all single sheets 42 to 47 are turned over in the output unit 16.

As already explained in connection with the image generating unit 12, there results a delay distance between the single sheets 44 and 45 when these are turned over, by means of which delay distance the period of time between the arrival of the front edge of the first single sheet 44 at the transfer point DE-PO and the arrival of the front edge of the single sheet 45 at the transfer point DE-PO is increased compared to the period of time between the arrival of the front edges of the single sheets 44 and 45 when these single sheets 44, 45 are fed to the output unit 16.

Altogether, the distance between the single sheets 44 and 45 both in the image generating unit 12 as well as in the output unit 16 has been increased. This increased distance can be taken into account in the effects of the processing times for performing the processing steps of the first post-processing unit 22 and of the second post-processing unit 24 as well as of the processing times of these single sheets in further downstream processing units. Preferably, the sum of the delay distances of all preceding processing units is each time deducted from a minimum distance required for a downstream processing unit, the highest value determined defining the feed distance at the transfer point PE-DE, i.e. the feed interval between the single sheets 44 and 45.

In particular, the travel time of a single sheet within an individual processing unit 12 to 16, 22, 24 of the printing system 10 is dependent on various factors such as the paper format, further paper parameters, the processing steps to be performed by this processing unit 12, 14, 16, 22, 24, such as the turning over of a single sheet, the stapling of several single sheets, the punching of single sheets, the gluing, the folding, the rotating of single sheets, the generating of a job offset between at least two single sheets, the monochrome printing on one side, the monochrome printing on both sides, the printing with several color separations, the interposing of single sheets that are not to be printed, or the non-execution of such processing steps. Further, for a safe function of the high-performance printing system 10, a plurality of basic conditions have to be met, such as that the sheets may not overtake one another so that a page-correct re-continuation can take place after errors that have occurred, that individual processing units 12 to 16, 22, 24 require other minimum distances than other processing units 12 to 16, 22, 24 so that the processing steps to be performed by the respective processing unit 12 to 16, 22, 24 can be performed in a safe and reliable manner, the distance in particular being dependent on the different processing steps for processing of an immediately preceding single sheet compared to the processing of the current single sheet in one and the same processing unit 12 to 16, 22, 24.

It is advantageous to transmit the requirements determined from the print data, i.e. from the print data stream and/or the print data-accompanying data, for processing a single sheet from a parser operation determining these requirements to a superordinated device control which can be implemented in the printer control 18. The device control then preferably communicates at least with control units of the post-processing units 22, 24 via a star-shaped data connection, a data connection arranged in a line structure or via a so-called daisy chain. In other embodiments, several structures of the data connection arrangements can also be combined with one another, in particular via a star-shaped distribution, several processing units 12, 14, 16, 22 can be connected with one another, further processing units 24 being connected via a daisy chain or a line structure to one of the star-shaped connected processing units 22. In doing so, pieces of information on the processing behavior, in particular on the required minimum distances for performing individual processing steps and processing step combinations of the individual processing units 12, 14, 16, 22, 24 can be taken into account in the determination of a smallest possible feed distance, as a result whereof the feed distance between two single sheets 32, 33; 44, 45 to be immediately processed one after the other is optimized.

Figure 6A:
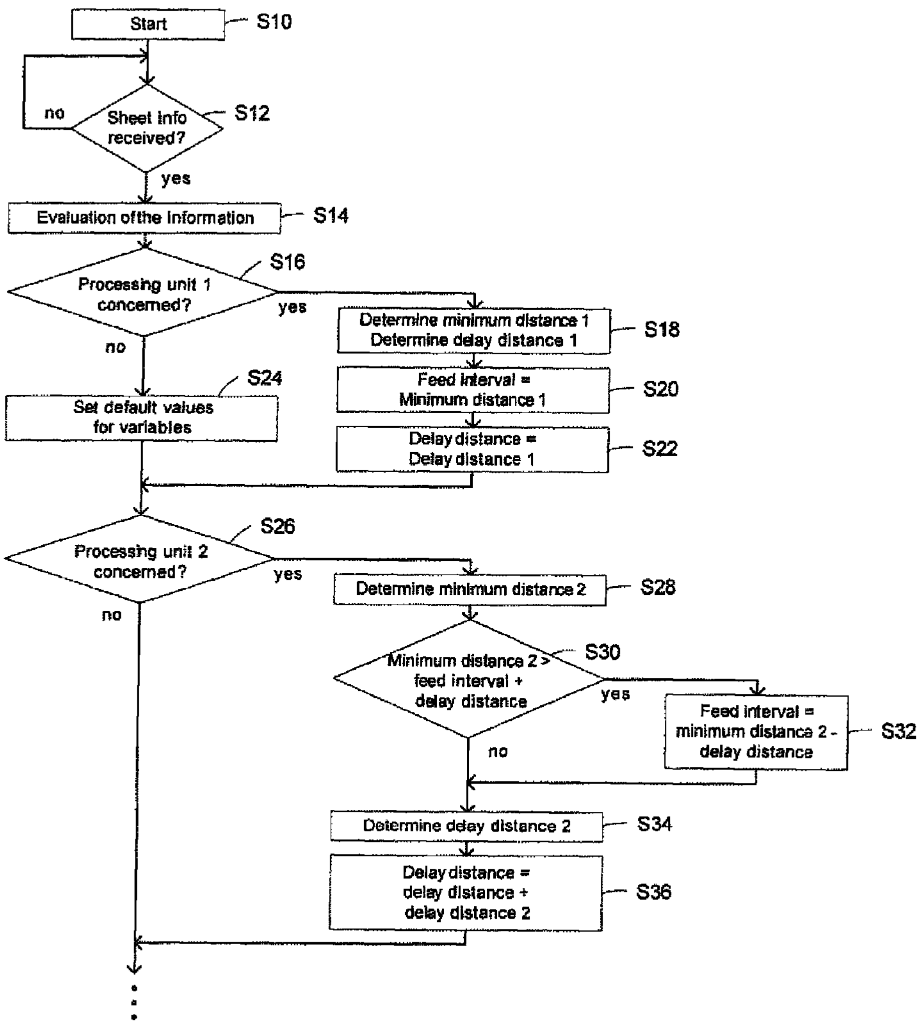
FIG. 6*a* shows the first par of a flow chart for determining a smallest possible feed distance required for processing single sheets following one after the other during feed-in of these single sheets.

In FIG. 6*a*, the first part of a flow chart for determining a smallest possible feed distance between two single sheets immediately following one after the other, in particular between the single sheets 32 and 33, is illustrated. The sequence is started in step S10. Subsequently, in step S12 it is checked whether a further single sheet 33 is to be processed by the printing system after the single sheet 32 in that page information for the single sheet 33 is determined from available print data and/or print job-accompanying data, which page information indicates which processing steps are to be performed by the processing units 12 to 16, 22, 24 of the printing system 10 and which paper format and which further paper parameters the single sheet 33 is supposed to have. If such information is not available, step S12 is repeated until page information for a further single sheet 33 to be processed is available.

If it is determined in step S12 that information for processing the further single sheet 32 is present, these pieces of information are subsequently evaluated in step S14. On the basis of these pieces of information, it is checked in step S16 whether a first processing unit 12 is to process the single sheet 33. If this is the case, then in step S18 a first minimum distance is determined for the first processing unit 12, which distance the single sheet 33 must have with respect to the immediately preceding single sheet 32, in order to perform processing steps for processing the first single sheet 32 and the second single sheet 33. Further, in step S18, the delay distance is determined which results from the difference in the processing times for the second single sheet 33 and for the first single sheet 32 in the first processing unit 12. Further, the feed interval with which the single sheet 33 is to be transferred by the feed unit 14 to the image generating unit 12 at the transfer point PI-DE after the single sheet 32 is, for the moment, determined by the minimum distance of the processing unit 12.

In the present embodiment, the feed unit 14 has no delay time which is to be taken into account in the determination of the feed interval. In other embodiments, the feed unit 14 is considered as first component and the image generating unit 12 arranged downstream thereof is considered as the second processing unit. The determined first delay time is set as the delay time after the first processing unit 12 in step S22. Thereafter, the sequence is continued as from step S26.

If, however, it is determined in step S16 that no further processing steps are to be performed by the first processing unit 12, in particular when the single sheets 32 and 33 are only guided through the processing unit 12 without the processing unit 12 further processing the single sheets 32, 33, the feed interval is set to a preset default distance in step S24 and the delay distance is set to a preset default delay distance, preferably to the distance zero.

Subsequently, it is checked in step S26 whether a second processing unit 16 is to perform processing steps on the single sheets 32 and 33 to be processed sequentially by the printing system 10 due to the pieces of information evaluated in step S14. If this is the case, subsequently a second minimum distance of the second processing unit 18 is determined in step S28, in a way similar to that described in connection with step S18. Subsequently, it is checked in step S30 whether this second minimum distance is greater than the sum of the current set feed interval and the determined delay time. If this is the case then in step S32 a new value for the feed interval is set which is formed from the difference between the second minimum distance and the delay distance. The delay distance used corresponds to the delay distance caused by the first processing unit. Subsequently, in step S34, the delay distance of the second processing unit 16 is determined. Thereafter, in step S36 a new delay distance is set on the basis of the sum of the delay distance valid up to now and the delay distance of the second processing unit 16 determined in step S34.

Subsequently, the sequence is continued in step S38 of FIG. 6*b*. If it is determined in step S26 that no further processing steps are to be performed by the second processing unit 16, since the processing unit 16 is either not included in the processing sequence, or the single sheets 32, 33 are only to be transported through this processing unit 16 one after the other, then the sequence is continued in step S38.

In step S38 it is checked whether a third processing unit 22 is provided for processing the single sheets 32 and/or 33. If this is the case, the required third minimum distance of the third processing unit 22 is determined subsequently in step S40. Thereafter, in step S42 it is checked whether the determined third minimum distance is greater than the sum of the feed interval valid up to now and the delay distance determined in step S36. This delay distance determined in step S36, is formed from the sum of the delay distances of the first processing unit 12 and of the second processing unit 16.

If it is determined in step S42 that the third minimum distance is greater than the determined sum, then subsequently the feed interval is determined from the difference between the third minimum distance and the valid delay distance in step S44. The delay distance can also be negative, as a result whereof the feed interval determined is greater than the third minimum distance. In case of a positive delay distance, the determined third minimum distance is reduced by the delay distance so that the set feed interval corresponds to the determined minimum distance reduced by the delay distance.

Subsequently or if it is determined in step S42 that the third minimum distance is not greater than the sum of the feed interval and the delay distance, the sequence is continued in step S46, where the delay distance of the third processing unit 22 is determined. Subsequently, a new delay distance is determined from the sum of the delay distance valid up to now and the delay distance of the third processing unit determined for the single sheets 32 and 33.

Thereafter or if it is determined in step S38 that the third processing unit 22 does not have to process the single sheets 32 and 33, the sequence is continued in step S50 where it is checked whether an n-th processing unit is provided for processing the single sheets 32 and 33. If this is not the case, the sequence is continued in step S62. Otherwise, the sequence is continued in step S52 where an n-th minimum distance required for the n-th component is determined. If the n-th minimum distance is greater than the sum of the feed interval valid up to now and the delay distance generated by the preceding processing units 1 to n−1, then in step S56 a new feed interval is determined from the difference between the n-th minimum distance and the delay distance.

Subsequently or if it is determined in step S54 that the n-th minimum distance is not smaller than the sum of the valid feed interval and the valid delay distance, the delay distance of the n-th processing unit caused by the different processing times of the single sheets 32 and 33 is determined in step S58. Thereafter, in step S60 the delay distance is set on the basis of the sum of the delay distance valid up to now and the n-th delay distance. In step S62, the determined feed interval is then transferred as a desired value to the input unit 14 or a process component for the determination of the desired value of the input unit 14. Subsequently, the sequence is terminated in step S64.

The n-th processing unit is, for example, the second post-processing unit 24.

The process sequences described with reference to the steps S26 to S36 for the second processing unit 18, the steps S38 to S48 for the third processing unit 22 and the steps S50 to S60 for the n-th processing unit are performed for each processing unit of the high-performance printing system 10 provided for processing the single sheets 32, 33 in the order in which the single sheets 32, 33 run through these processing units 12 to 16, 22, 24 arranged one after the other during a continuous course of processing. If the processing unit n is the last processing unit of such a continuous processing process, the execution of the steps S58 and S60 can be done without in other embodiments.

In the following, distance values determined with the aid of the flow chart of FIGS. 6*a* and 6*b* as well as the feed distance determined therewith are exemplarily given for two different print jobs or, respectively, for two sets of a print job:

Example 1

| | | | Intermediate results | |
|---|---|---|---|---|
| Processing unit: | Minimum distance: | Delay time: | Delay time | Feed distance |
| Input unit 14 | 400 ms | 0 ms | 0 ms | 400 ms |
| Print unit 12 | 4000 ms | −3600 ms | −3600 ms | 4000 ms |
| Output unit 16 | 500 ms | 150 ms | −3450 ms | 4100 ms |
| Post-processing unit 22 | 400 ms | 0 ms | −3450 ms | 4100 ms |
| Post-processing unit 24 | 800 ms | 0 ms | −3450 ms | 4250 ms |
| Minimum feed distance | | | | 4250 ms |

Example 2

| Processing | Minimum | | Intermediate results | |
|---|---|---|---|---|
| unit: | distance: | Delay time: | Delay time | Feed distance |
| Input unit 14 | 400 ms | 0 ms | 0 ms | 400 ms |
| Print unit 12 | 400 ms | 100 ms | 100 ms | 400 ms |
| Output unit 16 | 500 ms | 150 ms | 250 ms | 400 ms |
| Post-processing unit 22 | 600 ms | 0 ms | 250 ms | 400 ms |
| Post-processing unit 24 | 500 ms | 50 ms | 250 ms | 400 ms |
| Minimum feed distance | | | | 400 ms |

Figure 7:
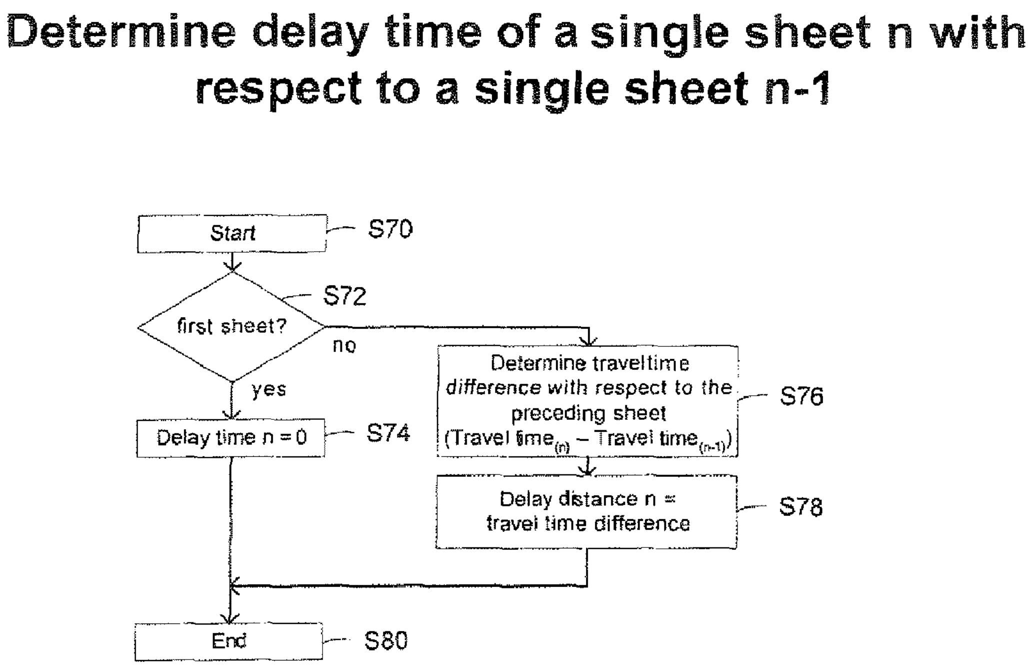
FIG. 7 shows a flow chart for determining a delay distance of a single sheet with respect to a preceding sheet in a processing unit.

In FIG. 7, a flow chart is illustrated with the aid of which the determination of the delay distance of the single sheet 33 with respect to the single sheet 32 in one of the processing units is explained in detail. In the following, the processing unit 12 is taken as an example. The sequence is started in step S70 Subsequently, in step S72 it is checked whether the sheet 33 is a first single sheet to be processed, for example after a printing pause or after the activation of the printing system 10. If this is the case, the delay distance for the processing unit 12 is assigned the value 0 in step S74. If it is determined in step S72 that the single sheet 33 is not the first sheet in a sequence of single sheets, but that the single sheet 33 immediately follows the first single sheet 32 and is thus a second single sheet, a travel time difference between the travel time of the second single sheet 33 and the single sheet 32 to be processed immediately before is determined in step S76. With the aid of this determined difference in travel time, a delay distance is subsequently determined in step S78 which indicates whether the distance between the single sheets 32, 33 is increased or decreased by the processing with the aid of the processing unit 12. Subsequently, the sequence is terminated in step S80.

All distances can be specified and processed both as periods of time and as spatial distances. In particular, it is possible to convert determined spatial distances with the aid of the transport speed of the single sheets and/or of the course of speed of the transport speed of the single sheets into period of times and vice versa.

Figure 8:
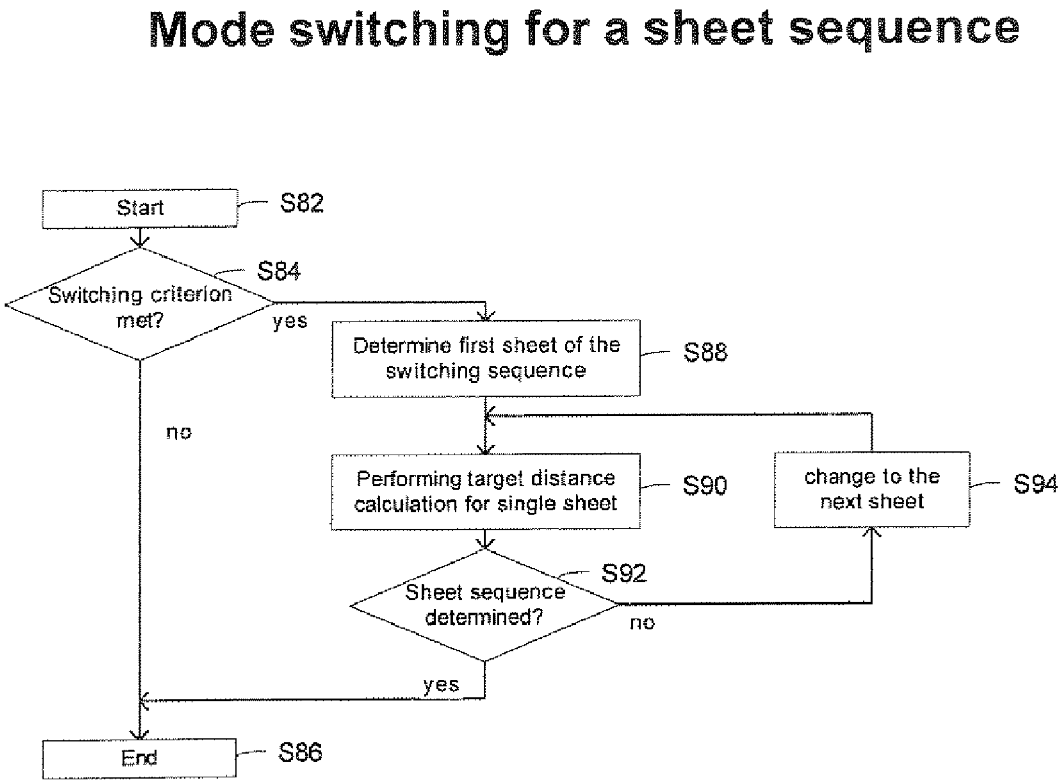
FIG. 8 shows a flow chart for switching the operating mode during the processing of a sheet sequence.

In FIG. 8, a flow chart for switching operating modes of the printing system 10 is illustrated. The print data stream supplied to the printing system 10 is analyzed with the aid of the print controller 18, at least a determination being made for each single sheet 30 to 41 to be processed as to whether it is to be printed with one color on one side, or with several colors on one side, or with one color on both sides or with several colors on both sides. For meeting the requirements resulting therefrom, a suitable operating mode of the printing unit 12 can be determined. However, it can be useful to maintain an operating mode required for the printing of preceding single sheets if the requirements for printing the current single sheet can also be met in the operating mode required for printing the preceding single sheet. Thus, there will not be a switch from the operating mode “duplex” and/or “multicolor” into the operating mode “simplex” and/or “one color” if subsequently only less than a preset number of single sheets are to be printed on one side or with one color. In doing so, it is checked whether a switch criterion for switching from a preset duplex operating mode to a simplex operating mode is met. It is checked whether a predetermined number of single sheets to be printed one after the other is to be printed on one side. The switching operation for switching the operating mode from "duplex" to "simplex" requires an additional waiting time for switching the conveying paths in the printing unit 12. This required number of single sheets is preset as a parameter in the printing system 10 and is, for example, set to three single sheets.

If the sequence of FIG. 8 is performed for the single sheets 30 to 41, then the sequence for these single sheets 30, 31, 32 is each stared in step S82. Subsequently, in step S84 it is determined each time that the switching criterion is not met since these single sheets 30, 31, 32 are each to be printed on both sides. Thus, the operating mode cannot be switched from "duplex" to "simplex". The sequence is terminated in step S86 for each of these single sheets 30, 31, 32.

If the sequence of FIG. 8 is afterwards run through for the single sheet 33, then the sequence is started in step S82. Subsequently, in step S84 it is determined that the switching criterion is not met, since no three successive single sheets, i.e. the single sheets 31, 32, 33, are to be printed on one side each. Thus, the operating mode is not switched from "duplex" to "simplex". The sequence is terminated in step S86.

If subsequently the single sheet 34 runs through the sequence of FIG. 8, then the sequence is started in step S82. Subsequently, it is determined in step S84 that the switching criterion is not met since no three successive single sheets, i.e. the single sheets 32, 33, 34, are to be printed on one side each. Thus, the operating mode is not switched from "duplex" to "simplex". The sequence is terminated in step S86.

If, subsequently, the single sheet 35 runs through the sequence of FIG. 8, then the sequence is started in step S82. Subsequently, it is determined in step S84 that the switching criterion is met, since three successive single sheets, i.e. the single sheets 33, 34, 35, are each to be printed on one side. Thus, the operating mode is switched from "duplex" to "simplex". Subsequently, in step S88 the first single sheet of the sheet sequence of single sheets 33, 34, 35 to be printed in the simplex operating mode, i.e. the single sheet 33, is determined in step S88.

Figure 6B:
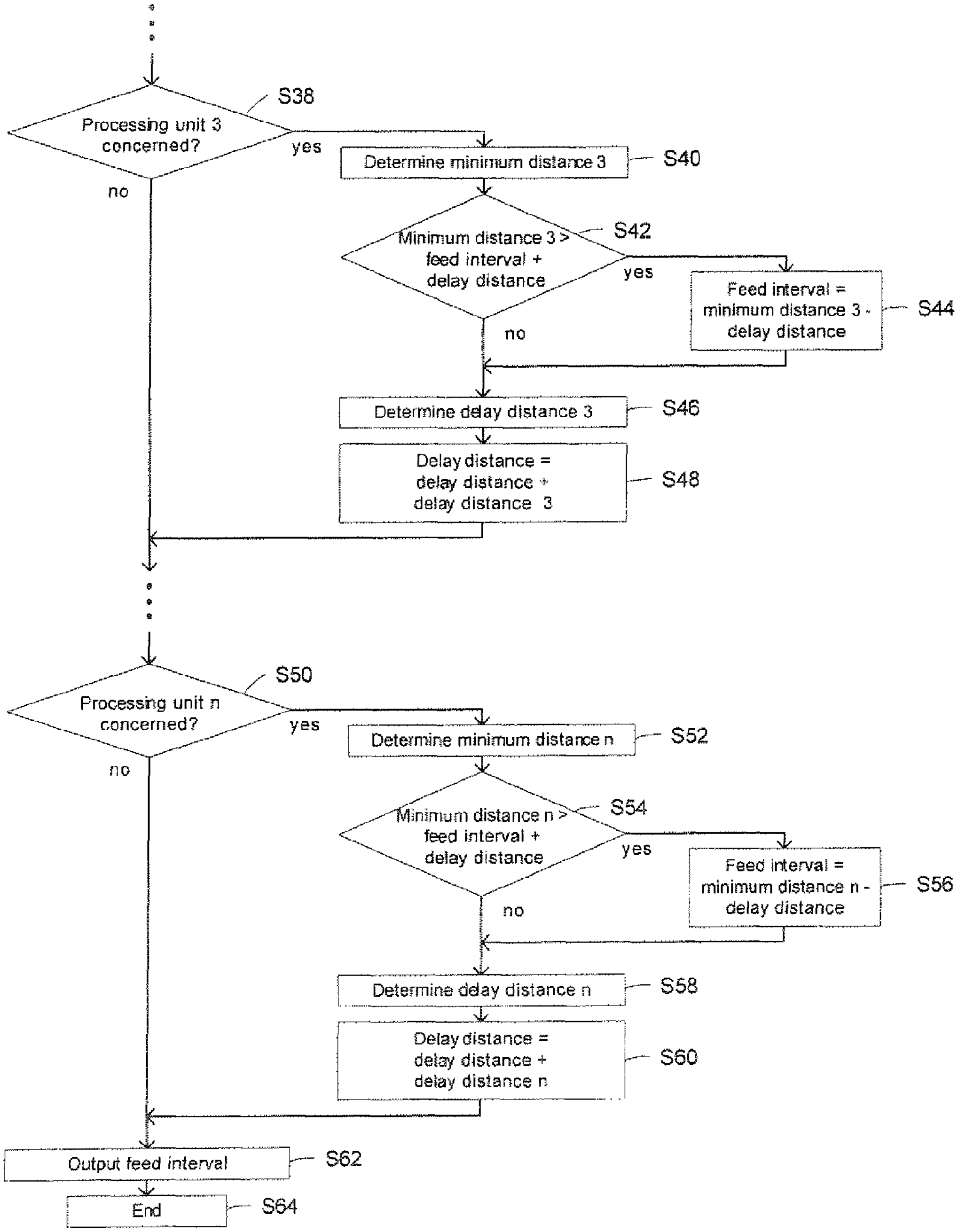
FIG. 6*b* shows the second pad of the flow chart of FIG. 6*a*.

As described further above, in the preceding execution of the flow chart illustrated in FIG. 8 the switching criterion is not met yet for the single sheets 33 and 34 so that with the aid of the flow chart illustrated in FIGS. 6*a* and 6*b* a distance has already been determined on the basis of the duplex operating mode. This distance has to be corrected subsequently for the single sheets 33 and 34 since by meeting the switching criterion the operating mode is already switched from "duplex" to "simplex" before the single sheet 33.

Thereafter, in step S90 a new distance for the single sheet 33 is determined according to the flow chart illustrated in FIGS. 6*a* and 6*b* and is set as a new feed distance for this single sheet 33 with respect to the preceding single sheet 32 for the operating mode "simplex".

Subsequently, it is checked in step S92 whether the single sheet 33 is the last single sheet of the sheet sequence of the single sheets 33, 34, 35. This is not true with respect to the single sheet 33 so that the sequence is continued in step S94. In step S94, a change is made to the next single sheet, i.e. the single sheet 34. Afterwards, the steps S90, S92 and S94 are repeated until it is determined in step S92 that in the present embodiment the single sheet 35 is the last single sheet of the sheet sequence which has caused a switching of the operating mode from "duplex" to "simplex". The sequence is then terminated in step S86.

Subsequently, the single sheets 36 to 41 run through the sequence of FIG. 8 and each time start in step S82. Thereafter, in step S84 it is determined each time that the switching criterion is not met since these single sheets 36 to 41 are each to be printed on one side. Thus, the operating mode does not have to be switched from "simplex" to "duplex". With respect to these single sheets 36 to 41, the sequence is each time terminated in step S86.

Although in the drawings and in the preceding description preferred embodiments have been illustrated and described with certain details, this is to be considered as being merely exemplary and as not restricting the invention. It is pointed out that only certain preferred embodiments have been illustrated and described and all variations and modifications which are within the scope of the invention at present or in the future are to be protected.

I claim as my invention:

1. A method for controlling a printing or copying system for processing single sheets, comprising the steps of:

sequentially processing a first single sheet and at least a second single sheet immediately following the first single sheet with aid of n processing units of the printing or copying system arranged one after the other;

determining a required minimum distance between the first and the second single sheet for each processing unit;

determining a delay distance for the first and at least for each of the n−1 following processing units;

forming a difference between the minimum distance of a processing unit and a sum of the delay distances of the preceding processing units; and determining a smallest possible distance with which the second single sheet is fed to the first processing unit after the first single sheet by a highest value of the determined minimum distance of the first processing unit and the determined differences.

2. A method according to claim 1 wherein with a first process component allocated to the processing unit obtaining data with pieces of information on the minimum distance of at least one processing unit with pieces of information for determining the minimum distance of the processing unit, with pieces of information on the delay distance of the processing unit, and/or with pieces of information for determining the delay distance of the processing unit;

said data is transferred from the first process component to a second process component or are deposited thereat;

the smallest possible distance is determined by the second process component; and the determined smallest possible distance is transferred to a third process component allocated to a further processing unit as pieces of information contained in the data.

3. A method according to claim 2 wherein the process components are hardware or software components of the printing or copying system, and the data is transferred between at least two of the process components via a standardized data interface.

4. A method according to claim 3 wherein a delay distance of the first processing unit is determined, which is taken into account in the determination of the smallest possible distance.

5. A method according to claim 1 wherein the processing steps for processing the first and the second single sheet to be performed by each of the processing units are determined with aid of pieces of information on the first and second single sheet which are contained in a print data stream and/or in print job-accompanying data.

6. A method according to claim 1 wherein the respective minimum distance required between the first single sheet and the second single sheet indicates the distance between the first and the second single sheet which the second single sheet must have with respect to the first single sheet in order to perform the processing steps to be performed by the respective processing unit for processing the first and the second single sheet in a safe manner.

7. A method according to claim 1 wherein the delay distance of a processing unit between two single sheets immediately following one another is formed by a difference between the processing time of the second single sheet and the processing time of the first single sheet.

8. A method according to claim 1 wherein spatial distances and/or temporal distances are determined and are set as distances.

9. A method according to claim 1 wherein at least one of the processing units comprises an image generating unit for generating at least one print image on at least one side of the single sheet, the printing or copying system comprising at least one post-processing unit, a piece of information for the determination of the minimum distance required for processing the first and/or second single sheet with aid of the post-processing unit and/or the required minimum distance are transmitted between the post-processing unit.

10. A method according to claim 1 wherein the processing units 1 to n−1 upstream of the processing unit n are the processing units which process a single sheet before the processing unit n, a delay distance being determined at least for said upstream processing units.

11. A method for controlling a printing or copying system for processing single sheets, comprising the steps of:

- with a first process component determining a smallest possible distance with which a second single sheet is to be fed to a first processing unit of the printing or copying system after a first single sheet;
- with a second processing unit transferring either a second minimum distance required or data with information for determining the second minimum distance required between the first single sheet and the second single sheet dependent on processing steps to be performed from a second process component to the first process component;
- determining with the first processing unit a first minimum distance required between the second single sheet and the first single sheet dependent on the processing steps to be performed; and
- setting the smallest possible distance dependent on the first minimum distance and the second minimum distance.

12. A method according to claim 11 wherein the first or a further process component determines the first minimum distance.

13. A method according to claim 11 wherein the first or a further process component determines at least the processing steps for determining the second minimum distance between the first single sheet and the second single sheet, said minimum distance being required for performing the determined processing steps to be performed by the first processing unit for processing the first and the second single sheet, the second minimum distance being determined with aid of the processing steps determined and the data transferred from the second process component to the first process components or wherein information on the processing steps is transferred to the second process component and the second process component determines the second minimum distance, and transfers them to the first process component.

14. A method according to claim 11 wherein spatial distances and/or temporal distances are determined and/or set as distances.

15. A method according to claim 11 wherein at least one processing unit comprises an image generating unit for generating at least one print image on at least one side of the single sheet, the printing or copying system comprises at least one post-processing unit, and wherein a piece of information for the determination of the minimum distance required for processing the first and/or second single sheet with the aid of said post-processing unit and/or the required minimum distance are transmitted between the post-processing unit and at least a further processing unit.

16. A method according to claim 11 wherein processing units 1 to n−1 upstream of a processing unit n is/are the processing units which process a single sheet before the processing unit n, a delay distance being determined at least for said upstream processing units.

17. A method according to claim 11 wherein the process components are hardware or software components of the printing or copying systems and the data is transferred between at least two of the process components via a standardized data interface.

18. A method according to claim 11 wherein a delay distance of the first processing unit is determined, which is taken into account in the determination of the smallest possible distance.

19. A method according to claim 11 wherein the processing steps for processing the first and the second single sheets to be performed by each of the processing units are determined with aid of the pieces of information on the first and the second single sheets which are contained in a print data stream and/or in print job-accompanying data.

20. A method according to claim 11 wherein the respective minimum distance required between the first single sheet and the second single sheet indicates the distance between the first and the second single sheet which the second single sheet must have with respect to the first single sheet in order to perform the processing steps to be performed by the respective processing unit for processing the first and the second single sheets in a safe manner.

21. A method according to claim 18 wherein the delay distance of a processing unit between two single sheets immediately following one another is formed by the difference between the processing time of the second single sheet and the processing time of the first single sheet.

22. A printing or copying system for processing single sheets, comprising:

- n processing units arranged one after the other for sequentially processing a first single sheet and at least a second single sheet immediately following the first single sheet; and
- at least one process component which determines a required minimum distance between the first and the second single sheet for each processing unit, which determines a delay distance for the first and at least for each of the n−1 following processing units, which forms a difference between the minimum distance of a processing unit and a sum of the delay distances of the preceding processing units, and which determines a smallest possible distance with which the second single sheet is fed to the first processing unit after the first single sheet by a highest value of the determined minimum distance of the first processing unit and the determined differences.

23. A printing or copying system for processing single sheets, comprising:

- a first processing unit and at least a second processing unit arranged downstream of the first processing unit, and which each sequentially process a first single sheet and at least a second single sheet immediately following the first single sheet;
- a first process component which determines a smallest possible distance with which the second single sheet is to be fed to the first processing unit of the printing or copying system after the first single sheet;

a second processing unit which transfers either a second minimum distance required or data with information for determining the second minimum distance required between the first single sheet and the second single sheet from a second process component to the first process component;

the first processing unit determining a first minimum distance required between the second single sheet and the first single sheet dependent on the processing steps to be performed; and the first process component setting the smallest possible distance dependent on the first minimum distance and the second minimum distance.

* * * * *